Figure 1:
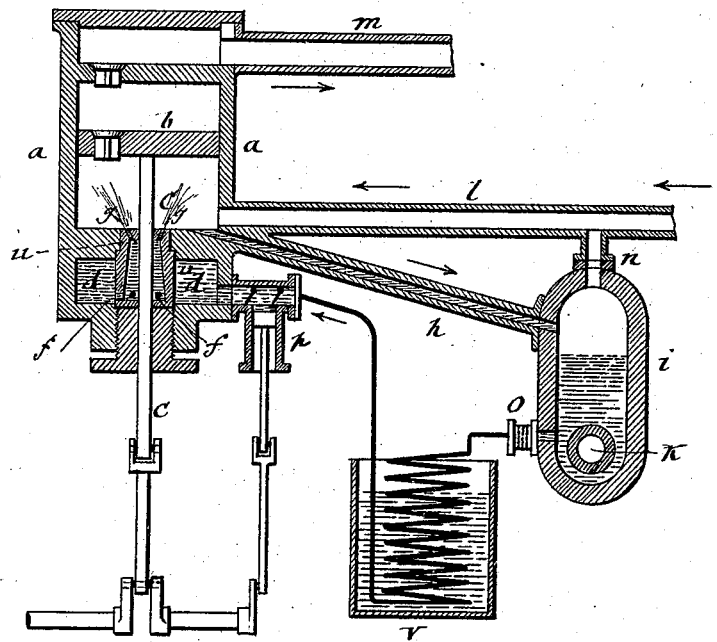

(No Model.)
2 Sheets—Sheet 1.

P. I. SCHMALTZ.
COMPRESSION AND VACUUM PUMP.

No. 504,093. Patented Aug. 29, 1893.

WITNESSES:
A. Schehl.
Charles Schroeder.

INVENTOR
Paul I. Schmaltz
BY
ATTORNEYS.

(No Model.) 2 Sheets—Sheet 2.
P. I. SCHMALTZ.
COMPRESSION AND VACUUM PUMP.
No. 504,093. Patented Aug. 29, 1893.
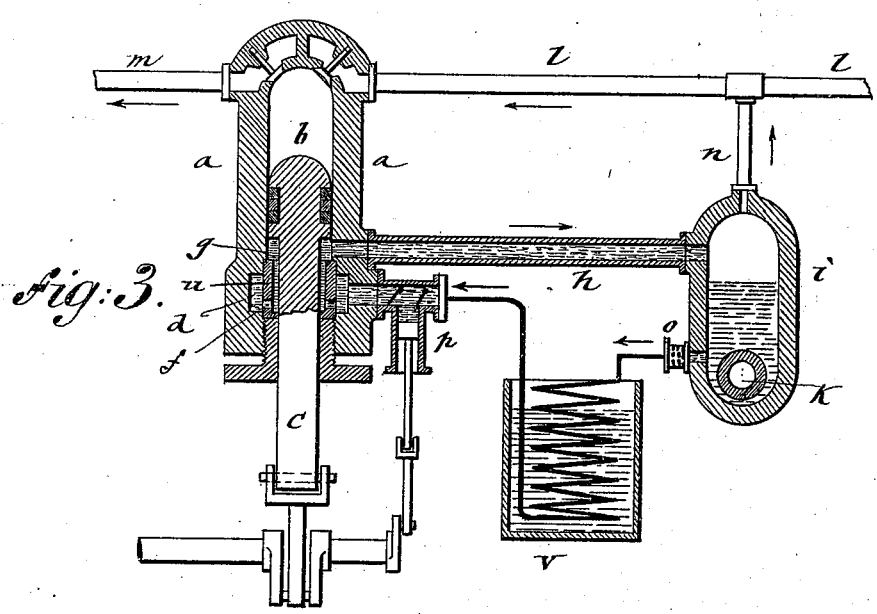
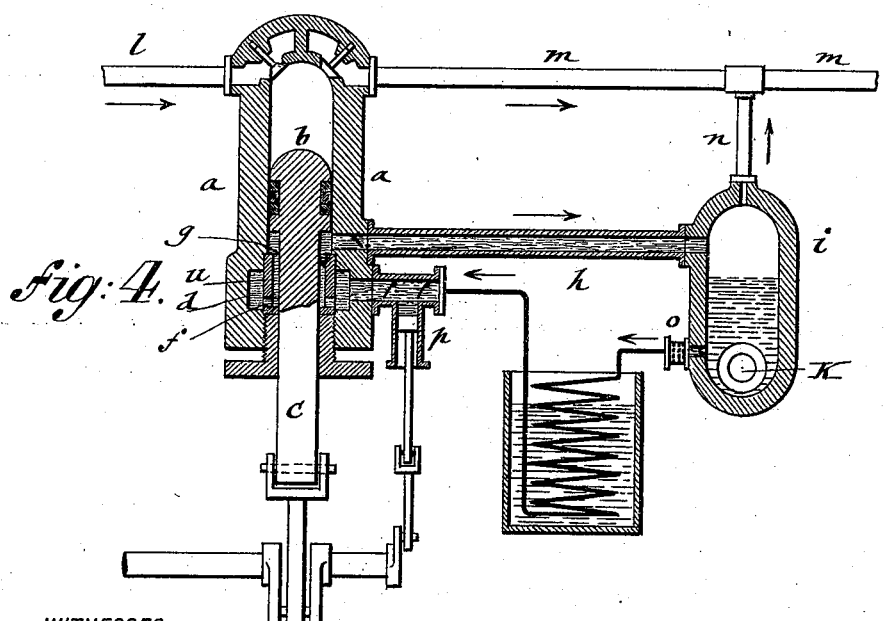
WITNESSES:
A. Schehl.
Charles Schroeder.
INVENTOR
Paul I. Schmaltz
BY
ATTORNEYS.

UNITED STATES PATENT OFFICE.

PAUL I. SCHMALTZ, OF HAMBURG, GERMANY.

COMPRESSION AND VACUUM PUMP.

SPECIFICATION forming part of Letters Patent No. 504,093, dated August 29, 1893.

Application filed December 12, 1891. Serial No. 414,777. (No model.)

*To all whom it may concern:*

Be it known that I, PAUL I. SCHMALTZ, a subject of the German Emperor, residing in Hamburg, in the Empire of Germany, have invented some new and useful Improvements in Compression and Vacuum Pumps, of which the following is a specification.

This invention relates to certain improvements in the sealing and lubricating of the pistons and piston-rods of compression and vacuum-pumps, whereby the more successful operation of this class of machines is obtained.

Heretofore the gas-compressors which were used in refrigerating and ice-making machinery were sealed and lubricated either, first, by arranging a chamber in the compressor-cylinder next to the stuffing-box of the piston-rod and keeping this chamber filled with a suitable lubricating liquid, which surrounds the piston-rod; secondly, by supplying the lubricating liquid to a chamber in the stuffing-box and renewing it. This liquid is separated from the interior of the compressor cylinder as well as from the atmosphere by suitable packings. In the first arrangement, the lubricating liquid is at rest, the piston-rod moving through the same so that the gases which mechanically adhere to the piston-rod are partly detached by its motion through the liquid body. The lubricating liquid is thereby saturated with gas so that the loss of the same through the packing cannot be entirely avoided. In the second case, the liquid is in motion and moves at right-angles to the piston-rod so as to absorb the gas adhering to the same. This object is, however, only imperfectly accomplished so that considerable losses of refrigerating vapors are occasioned. In this latter arrangement no lubrication of the piston itself takes place.

The object of my invention is to so improve the compression and vacuum-pumps of refrigerating and other machinery that the pistons, as well as the piston-rod, are sealed and lubricated at the same time, while the gases that are absorbed by the lubricating liquid are separated from the same and returned into the compressor.

The invention consists partly in the combination of a compressor-cylinder, an annular chamber at the head of said cylinder around the main piston-rod, a duct leading directly from said annular chamber into the cylinder, a pump for forcing the lubricating liquid into said annular chamber, and means for reciprocating the cylinder piston and the pump piston simultaneously in opposite directions, whereby the ducts are practically closed on the outward stroke of the cylinder piston by the force of the lubricating liquid under the action of the pump piston and the surplus lubricant forced into the return-pipe under the joint action of the pistons.

The invention further consists in other combinations of parts hereinafter set forth in the claims.

Figure 2:
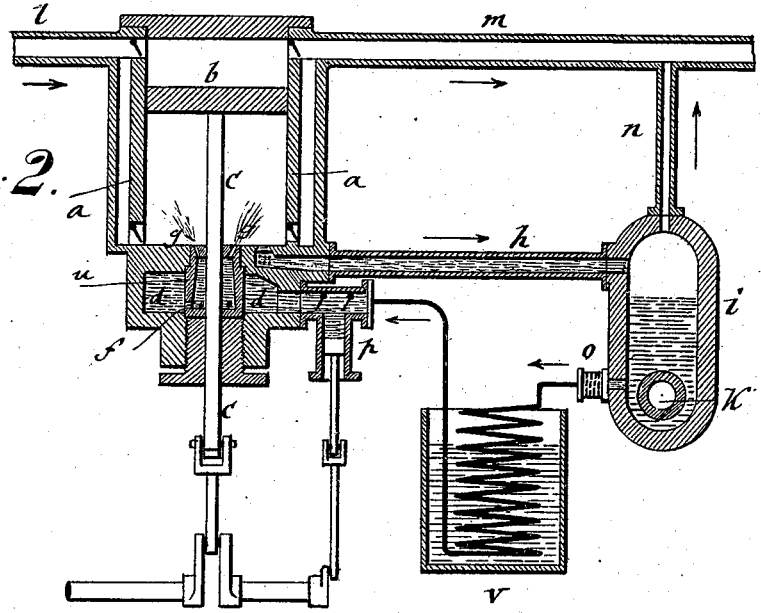

In the accompanying drawings, Figure 1 represents a vertical central section of a single-acting compressor, showing its connection with the liquid-collecting tank and with the cooler for said liquid. Fig. 2 is a vertical section of a double-acting compressor, showing its connection with the tank for the lubricating liquid and with a cooler for the same, the tank being connected in this arrangement with the high-pressure gas-main. Fig. 3 is likewise a vertical section of a single-acting compressor in which the gas-suction and discharge-valves are arranged at one end of the compressor, and in which the piston acts on the stuffing-box side in the nature of a plunger for the lubricating liquid; and Fig. 4 is likewise a vertical central section, showing a similar arrangement to that shown in Fig. 3, in which the collecting-tank for lubricating liquid is connected with the high-pressure gas-main.

Similar letters of reference indicate corresponding parts.

Referring to the drawings, $a$ represents the cylinder of the compressor, $b$ the piston in the same, $c$ the piston-rod, $d$ a chamber which surrounds the piston-rod adjacent to the stuffing-box of the same, and which is filled with the lubricating liquid that is forced into it from the outside. From the chamber $d$, the liquid passes to the interior of a cylindrical casing $u$ forming an inner annular chamber that surrounds the piston-rod $c$, which casing is provided with openings $f$ near its base for the passage of the liquid and with openings $g$ in its head or nozzle, through which the lubricating liquid is ejected in small jets into the interior of the compressor-cylinder $a$. In place of the small jet-openings, an annular opening $g$ may be used through which the lubricating liquid is ejected into the compressor-cylinder, as shown in Figs. 3 and 4. The use of a number of smaller openings or of an annular opening depends on the refrigerating agent employed or on the relative size of the piston and piston-rod. From the cylinder $a$ of the compressor the lubricating liquid passes through a connecting-pipe $h$ into a collecting tank $i$, in the lower part of which is arranged a pipe $k$ that is heated by steam or other medium and which serves to heat the lubricating liquid and drive off the vapors which are absorbed during the passage of the liquid through the compressor. The upper part of the collecting-tank $i$ is connected by one or more pipes $n$ with either of the gas-main $l$ or $m$, according as it is desired to connect the tank $i$ with the low-pressure or the high-pressure main of the compressor. When the gases that are separated from the lubricating liquid, are conducted into the low-pressure main $l$, as shown in Figs. 1 and 3, they pass with the vapors from the expanding-coils into the compressor, while when the tank is connected with the high-pressure main $m$, as shown in Figs. 2 and 4, the vapors which are evaporated from the liquid are conducted with the compressed gases to the condenser. From the lower part of the collecting-tank $i$, the lubricating liquid passes through one or more strainers $o$ that are arranged in a cylindrical casing to a cooler of any approved construction. The strainers $o$ serve to clean the lubricating liquid from grit, scale or other impurities. From the cooler $v$, the lubricating liquid is forced by a circulating-pump $p$ into the chamber $d$, the piston of the pump being operated by a crank on the driving-shaft of the compressor-piston and provided with suction and discharge-valves for the regular supply of the liquid. The circulating-pump $p$ may be single-acting or double-acting, in which latter case a certain quantity of liquid would be forced into the compressor with every stroke of the piston. The lubricating liquid is moved by the pump in a closed cycle and under exclusion of the atmosphere, it passing from the chamber surrounding the piston-rod through the compressor-cylinder to the collecting tank, through the cooler back to the pump, and from the same to the chamber and cylinder.

It is obvious that all the parts described are not necessary for all applications of the pump, as, for instance, the exterior chamber to which the circulating-pump is connected, may be dispensed with and the interior chamber connected directly with the pump-chamber, or the heater in the collecting tank may be dispensed with, or the strainers on the tank, or even the pump, as the same effect may be obtained by the difference in the pressures between the low-pressure and high-pressure gas.

When the collecting-tank $i$ is connected to the high-pressure gas-main, it is necessary to provide the supply-pipe $h$ with a valve so that the piston of the compressor, when it arrives at the end of its stroke, serves to force the accumulated lubricating liquid into the collecting tank.

Figs. 1 and 3 illustrate the application of the sealing and lubricating liquid to a compressor that is operated with gases of low tension, while Figs. 2 and 4 are adapted for gases of high tension.

Figs. 3 and 4 show the suction and discharge-valves arranged at one end of the compressor-cylinder while the piston is arranged on the stuffing-box side in the form of a plunger for the lubricating liquid. The piston of the pump and the piston of the cylinder move in opposite directions that is to say when the piston of the cylinder moves outward the piston of the pump has an inward stroke. The inward stroke of the pump piston forces the oil into the chamber $u$ surrounding the piston rod of the cylinder piston and thence it is sucked into the cylinder by the inward motion of the main piston. When the main piston is in its outward motion it acts in conjunction with the force of the pump piston and the two forces combined return the oil into the pipe $h$ and back into the reservoir $i$.

The construction shown in the drawings is applicable to single or double-acting compressors, both of the horizontal and vertical type.

The advantages obtained by my improved supply of the sealing and lubricating-liquid are as follows: first, a perfect lubrication of the piston and piston-rod; secondly, a very effective sealing of the piston-rod whether there is pressure or a vacuum in the cylinder; thirdly, the prevention of injury to the piston-rod caused by the accumulation of dirt, grit or scale around the same; fourthly, a very small loss of gas by leakage; and, lastly, reduced friction that is exerted on the piston-rod inasmuch as a less tight packing can be used in the stuffing-box of the same.

Having thus described my invention, what I claim as new, and desire to secure by Letters Patent, is—

1. The combination of a compressor cylinder, an annular chamber at the head of said cylinder around the main piston-rod, ducts leading directly from said annular chamber into the cylinder, a pump for forcing the lubricating liquid into said annular chamber, and means for reciprocating the cylinder piston and the pump piston simultaneously in opposite directions, substantially as set forth.

2. The combination, of a compressor-cylinder, a chamber disposed around the piston-rod, a cylindrical casing in said chamber, said casing being provided with supply-openings near its base and an opening or openings into the pump cylinder, a collecting-tank for the lubricating liquid connected with the cylinder and with a gas-main, and means for forcing the lubricating liquid through the chamber and its casing into the cylinder, substantially as set forth.

3. The combination, of a compressor-cylinder, an inner chamber disposed around the piston-rod provided with openings leading into said cylinder, an outer chamber disposed around said inner chamber and provided with openings leading into said inner chamber, and means for pressing the lubricating liquid into said outer chamber for the purpose of lubricating the piston and lubricating and sealing the piston-rod, substantially as set forth.

4. The combination, of a compressor-cylinder, an inner chamber disposed around the piston-rod provided with openings leading into said cylinder, an outer chamber disposed around said inner chamber and provided with openings leading into said inner chamber, a collecting tank for the lubricating liquid connected with the cylinder and with a gas-main, and means for forcing the liquid into the cylinder while the piston-rod is moved in upward direction.

5. The combination, of a compressor cylinder, a chamber disposed around the piston-rod, a collecting-tank for the lubricating liquid connected with the cylinder and with a gas-main, a heater in said tank for evaporating the vapors absorbed by the liquid, a cooler connected with the outlet opening of said tank, a strainer between said tank and cooler, and a circulating pump connected to the cooler and with the chamber around the piston-rod, substantially as set forth.

6. The combination, of a compressor cylinder, a chamber disposed around the piston-rod, a cylindrical casing in said chamber, said casing being provided with supply openings near its base and an opening or openings into the pump cylinder, a collecting tank for the lubricating liquid connected with the cylinder and with a gas-main, means for forcing the lubricating liquid through the chamber and into its casing into the cylinder, and a pipe for conducting the lubricating liquid from said cylinder back to the collecting tank.

In testimony that I claim the foregoing as my invention I have signed my name in the presence of two subscribing witnesses.

PAUL I. SCHMALTZ.

Witnesses:
M. THIELE,
M. F. SCHMALTZ.